J. KRALUND.
WEIGHING APPARATUS.
APPLICATION FILED MAY 8, 1920.
1,416,477.
Patented May 16, 1922.
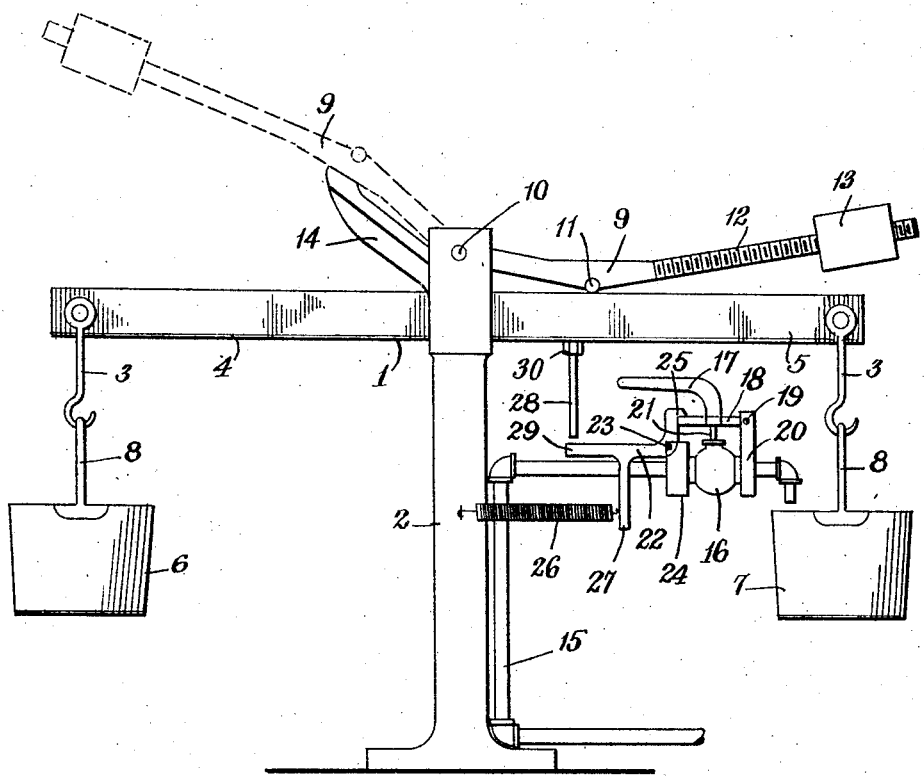
Inventor
John Kralund
By his Attorney

UNITED STATES PATENT OFFICE.

JOHN KRALUND, OF BROOKLYN, NEW YORK, ASSIGNOR TO DOEHLER DIE CASTING COMPANY, OF BROOKLYN, NEW YORK, A CORPORATION OF NEW YORK.

WEIGHING APPARATUS.

1,416,477.   Specification of Letters Patent.   Patented May 16, 1922.

Application filed May 8, 1920. Serial No. 379,713.

*To all whom it may concern:*

Be it known that I, JOHN KRALUND, a citizen of the United States, residing in the borough of Brooklyn, city of New York, county of Kings, and State of New York, have invented certain new and useful Improvements in Weighing Apparatus, of which the following is a specification.

My invention relates to weighing apparatus which is particularly adapted for use in measuring proportional amounts of substances. The apparatus is particularly intended for use in providing the proper amounts of plaster and water to be mixed together in forming plaster molds. It will be obvious, however, that the apparatus may readily be used for other purposes.

In accordance with my invention I provide a scale beam which is pivotally mounted on a support so as to have arms extending on opposite sides thereof. Containers are hung from the two arms of the beam, one of the containers being intended to contain one material such as plaster, and the other container to be filled with a different material such, for example, as water. A pipe is provided for carrying fluid to this latter container, the pipe being provided with a normally closed valve. When the other container has been filled with material, the weight of which is to be balanced, the valve is opened by a manual means, such as a valve lever which is latched in position to hold the valve open. When a proper amount of fluid has flowed through the pipe into the container, the beam is over-balanced and a trip pin or the like is caused to trip the latch referred to whereupon the flow of fluid to the container is immediately stopped. The weight of material, such as plaster, which is to be placed in the other container may first be determined by the provision of a graduated weight-carrying arm which is positioned to bear on the arm of the beam from which the fluid container is hung, this graduated arm being pivoted to or otherwise suitably mounted in the beam support so that it may be swung back or otherwise put out of operation when the proper amount of plaster or other material has been placed in the one container, before fluid is caused to run into the other container to balance the same.

In order that a clearer understanding of my invention may be had, attention is hereby directed to the accompanying drawing forming part of this application and illustrating one embodiment of my invention. In the drawing the figure shows a side elevation of an apparatus embodying my invention.

Referring to the drawing the scale beam 1 is pivotally mounted in the usual fashion, as upon a knife edge, upon the vertical support 2, through an opening within which the scale beam extends. Hooks 3, 3 are pivotally suspended from suitably chosen points on the opposite arms 4 and 5 of the beam. Buckets or other suitable containers 6 and 7 are provided with bails 8, 8 by which they may be hung over the hooks 3, 3. Containers 6 and 7 may be hung from points which are equally distant from the pivotal support of beam 1 or from points which are unequally distant from the pivot, if it is desired to have the weight of material in one container different from the weight of material in the other container in a determined ratio.

The arm 9 is pivotally mounted at one end by means of a pin 10 to the support 2 above the scale beam 1. Arm 9 is preferably bent as shown so as to provide an edge or bearing surface 11 which is adapted to bear on the arm 5 of the beam 1 when arm 9 is swung downwardly into the position indicated in full lines in the drawing. Arm 9 is provided for part of its length with graduations 12 and carries a weight 13 which is adjusted into different positions along the graduations 12. When arm 9 is out of operation it may be supported by any suitable means such as the bracket 14 which is shown as secured to support 2 above the beam 1.

The weight of material, such as plaster, which is to be placed in container 6 for each operation, having first been determined, arm 9 is positioned on the beam arm 5 and weight 13 positioned to balance the weight of the load which is to be placed in container 6. Container 6 is then filled with plaster or other material until the weight of the same is sufficient to bring beam 1 into balance. The arm 9 may then be thrown out of operation into its dotted line position, if it is desired that the weight of material to be placed in container 7 is to exactly balance the weight of the material in container 6.

A pipe 15 is provided for carrying fluid, such as water, to container 7. This pipe is provided with a normally closed valve 16 which may be of the type known as a whistle valve, that is, a valve which may be of the poppet type in which the opening through the valve is normally closed by a spring-pressed member. A valve lever 17 is provided with an arm 18 pivoted at 19 to a support 20 which may be secured on the pipe. A stem 21 which is carried by lever 17 extends into the valve casing.

When lever 17 is depressed into the position shown stem 21 will move the movable member of the valve out of position in which it closes the pipe, but when lever 17 is not depressed the spring in the valve structure serves to hold the movable member of the valve in position to close the opening and to hold lever 17 in raised position. Valves of the character referred to are well known and I do not deem it necessary to illustrate the internal construction of the same.

A latch-lever 22 is pivotally mounted at 23 to a support 24 which may be secured to pipe 15. This latch-lever has a nose 25 which is adapted to latch the free end of arm 18 of valve-lever 17. A spring 26 is secured at one end to support 2 and at its other end to a vertical arm 27 of latch-lever 22 so as to hold the nose 25 of the latch-lever in engagement with the free end of arm 18. A trip pin 28 carried by arm 5 of beam 1 is adapted to engage the tail 29 of trip lever 22 to trip the latch, when scale beam arm 5 descends. Trip pin 28 may be adjustable in length, as by providing the same with screw-threads at its upper end and screwing it into a nut 30 secured to beam arm 5.

When container 6 has been filled with the desired amount of material which is to be balanced, as stated, valve-lever 17 is pushed down to the position shown in the drawing in which it is latched by the nose 25 of latch-lever 22. Valve 16 is now open and water or other fluid flows through pipe 15 into the container 7 until a balance has been attained between the weights of containers 6 and 7 with the loads carried by each. The arm 5 of the beam then descends whereupon pin 28 strikes the tail 29 of the latch-lever, unlatching arm 18 of the valve-lever 17 which is immediately raised by the spring contained within the valve, the valve accordingly being closed so that no more fluid will flow into the container 7. Containers 6 and 7 now contain the desired amounts of material for the desired mixture or other purpose and accordingly they may be emptied and the operation repeated.

It will be obvious that the weight 13 may be moved inwardly over the graduated portion 12 of arm 9, after the weight of material in container 6 has been ascertained, the weight 13 then being positioned at a desired point to partly balance the weight of material in container 6. In this case, arm 9 being left in contact with beam arm 5, the container 7 with its contents and the weight 13 in its new position, will together balance the weight of container 6 and its contents. If it be desired, for example, to fill container 7 with fluid weighing only half as much as the material in container 6, containers 6 and 7 being equally distant from the point of support of the beam 1, for example, it is only necessary to move weight 13 inwardly to a position in which it will balance one half of the material in container 6.

What I claim is:

1. In weighing apparatus, the combination of a support, a beam pivoted thereon, containers secured to the opposite arms of said beam, a graduated arm pivotally secured to said support and adapted to bear on one of the arms of said beam, and to be swung out of engagement therewith, a weight adjustably mounted on said graduated arm, a pipe for carrying fluid to the container carried by the beam arm on which said graduated arm is adapted to bear, a valve in said pipe, and means automatically closing said valve when said container with its contained fluid balances the other container with its load.

2. In weighing apparatus, the combination of a support, a beam pivoted thereon, containers secured to the opposite arms of said beam, a pipe for carrying fluid to one of said containers, a normally closed valve in said pipe, a pivoted valve-lever having a stem adapted to open said valve, when depressed, a pivoted latch lever adapted to latch said valve lever in depressed position, a spring adapted to hold said latch-lever in latching position, and a pin movable with the arm of said beam to which said fluid container is secured, positioned to trip said latch-lever when said beam arm descends.

This specification signed and witnessed this 4th day of May, 1920.

JOHN KRALUND.

Witnesses:
WILLIAM R. AHRBERG,
WILLIAM E. BAUERSCHMIDT.